(12) United States Patent
Ishibai

(10) Patent No.: US 9,517,801 B2
(45) Date of Patent: Dec. 13, 2016

(54) CAB REINFORCING STRUCTURE

(71) Applicant: HINO MOTORS, LTD., Hino-shi (JP)

(72) Inventor: Nobuyoshi Ishibai, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 14/436,167

(22) PCT Filed: Oct. 23, 2013

(86) PCT No.: PCT/JP2013/006256
§ 371 (c)(1),
(2) Date: Apr. 16, 2015

(87) PCT Pub. No.: WO2014/068906
PCT Pub. Date: May 8, 2014

(65) Prior Publication Data
US 2015/0298747 A1    Oct. 22, 2015

(30) Foreign Application Priority Data

Nov. 2, 2012 (JP) ................. 2012-242952

(51) Int. Cl.
*B62D 33/06* (2006.01)
*B62D 21/15* (2006.01)
(Continued)

(52) U.S. Cl.
CPC ........... *B62D 33/063* (2013.01); *B60R 21/131* (2013.01); *B62D 21/15* (2013.01); *B62D 21/157* (2013.01);
(Continued)

(58) Field of Classification Search
CPC ....... B62D 25/06; B62D 25/08; B62D 25/087; B62D 33/06; B62D 33/0612; B62D 21/15; B62D 21/157; B60R 2021/137; B60R 2021/131; B60R 2021/0069; B60R 2021/0074; B60R 2021/001; B60R 21/13; B60R 21/131
(Continued)

(56) References Cited

U.S. PATENT DOCUMENTS 3,279,843 A * 10/1966 Hafer ...................... B62D 33/06
296/190.08
3,918,740 A * 11/1975 Notestine ................ B60R 21/13
280/756
(Continued)

FOREIGN PATENT DOCUMENTS

JP    2000-318659 A    11/2000
JP    2002-503180 A    1/2002
(Continued)

OTHER PUBLICATIONS

International Search Report issued Jan. 14, 2014 in PCT/JP2013/006256 filed Oct. 23, 2013.

*Primary Examiner* — Gregory Blankenship
(74) *Attorney, Agent, or Firm* — Oblon, McClelland, Maier & Neustadt, L.L.P.

(57) ABSTRACT

With two points each inward of a vehicle-widthwise outer end of an upper portion of a back panel 4 of a cab 1 being set as load support points A and B, a pair of reinforcing studs 13 and 14 are mounted on the back panel 4 to connect the load support points A and B with a floor 9 directly on paired rear-side cab mountings 7 and 8 for support of a rear of the cab 1 from a frame 6, and a reinforcing beam 12 is mounted on the back panel 4 to interconnect upper ends of the reinforcing studs 13 and 14, unreinforced sections being left as shock absorptive portions 15 and 16 at vehicle-widthwise opposite ends of the reinforcing beam 12.

1 Claim, 2 Drawing Sheets

(51) Int. Cl.
  *B60R 21/13* (2006.01)
  *B62D 33/063* (2006.01)
(52) U.S. Cl.
  CPC ......... *B62D 33/06* (2013.01); *B60R 2021/137* (2013.01)
(58) Field of Classification Search
  USPC ......... 296/187.13, 190.01, 190.08, 102, 210; 280/756; 180/89.12, 89.13, 89.16, 89.19
  See application file for complete search history.

(56) References Cited

U.S. PATENT DOCUMENTS

| | | | | |
|---|---|---|---|---|
| 4,600,236 | A | * | 7/1986 | Weiss ................. B62D 33/0617 180/89.12 |
| 5,636,867 | A | * | 6/1997 | McNabb ............... B60R 21/131 180/89.12 |
| 6,076,884 | A | * | 6/2000 | Osman ............... B62D 33/0612 296/190.02 |
| 8,083,286 | B2 | * | 12/2011 | Buda .................. B62D 33/0612 296/190.08 |
| 8,579,364 | B2 | * | 11/2013 | Fukudome ............. B62D 25/06 296/190.03 |
| 2010/0314908 | A1 | * | 12/2010 | Wood, Jr. ........... B62D 33/0617 296/190.03 |
| 2013/0127205 | A1 | * | 5/2013 | Jaynes .................. B62D 25/06 296/190.1 |

FOREIGN PATENT DOCUMENTS

| | | |
|---|---|---|
| JP | 2003-165470 A | 6/2003 |
| WO | 99/24310 | 5/1999 |

* cited by examiner

CAB REINFORCING STRUCTURE

TECHNICAL FIELD

The present invention relates to a cab reinforcing structure.

BACKGROUND ART

To tighten vehicle regulations is recently in progress specifically in Europe and the like. For example, a strength test is newly scheduled for a large cabover truck or the like in which an upper side surface of a cab 1 is hit by an impactor 2 to precedingly apply a side-surface impact as shown in FIG. 1, and then an upper surface on a roof panel 3 of the cab 1 is hit by a further impactor 2' to apply a vertical load as shown in FIG. 2.

Specifically, the new strength test is for testing of strength of the cab 1 in overturn. In an actual overturn, precedingly the cab 1 rolls on its side to apply the side-surface impact on the upper side surface of the cab 1 and then the cab 1 further rolls into upside down (180-degree turn) to apply the vertical load on the cab 1. In the test, consideration is taken on such impacts applied in the actual overturn.

A related reference to the invention is, for example, Patent Literature 1 mentioned below.

CITATION LIST

Patent Literature

[Patent Literature 1] JP 2002-503180A

SUMMARY OF INVENTION

Technical Problems

A conventional reinforcing structure for the cab 1, however, complies with a conventional test of merely hitting the upper surface of the cab 1 by the impactor 2' to apply the vertical load. As shown in FIG. 3 as indoor view of a back panel 4 in the conventional cab 1, employed is a structure strongly sustainable to the vertical load comprising, for example, a reinforcing beam 5 mounted throughout a vehicle width on an upper portion of an indoor wall surface of the back panel 4, and a pair of reinforcing studs 10 and 11 mounted on the back panel 4 to stand upright, for connection with the reinforcing beam 5, from a floor 9 directly on rear-side cab mountings 7 and 8 which in turn are on a frame 6 to support a rear of the cab 1. In such conventional structure, most of energy in the preceding side-surface impact applied on the upper side surface of the cab 1 acts through the reinforcing beam 5 on the reinforcing studs 10 and 11, so that the reinforcing studs 10 and 11 tend to become deformed and tilted down in a direction reverse to an input direction of the side-surface impact. When the tilted reinforcing studs 10 and 11 succeedingly receive the vertical load applied thereon, intended strength of the cab 1 may not be exhibited to increase the deformation (see FIG. 2) and make it difficult to ensure a survival space enough for prompt escape of a driver.

The invention was made in view of the above and has its object to ensure a survival space enough for prompt escape of a driver even in overturn where a side-surface impact applied is followed by a vertical load applied.

Solution to Problems

The invention is directed to a cab reinforcing structure characterized in that, with two points each inward of a vehicle-widthwise outer end on an upper portion of a back panel in a cab by a predetermined length being set as load support points, a pair of reinforcing studs are mounted on said back panel to connect said load support points with a floor directly on a pair of rear-side cab mountings for support of a rear of said cab from a frame while a reinforcing beam is mounted on said back panel to interconnect upper ends of said reinforcing studs, unreinforced sections being left as shock absorptive sections at vehicle-widthwise opposite ends of said reinforcing beam.

In the structure thus constructed, when in overturn the cab rolls on its side to apply the side-surface impact on the upper side surface of the cab, deformation concentrates to the shock absorptive sections weak in strength relative to a section reinforced by the reinforcing beam to absorb the energy of the side-surface impact, which suppress deformation of the section reinforced by the reinforcing beams as well as tilt-down deformation of the reinforcing studs in the direction reverse to the input direction of the side-surface impact.

Then, even when the vehicle and thus the cab further rolls into upside down (180-degree turn) to apply the vertical load on the cab, the cab is strongly supported vertically by the reinforcing studs to suppress crushing deformation because of the suppressed tilt-down deformation of the reinforcing studs due to the preceding side-surface impact.

Further, it is preferable in the invention that the load support points are set vehicle-widthwisely outward of an arrangement span of the rear-side cab mountings, respectively, so that the reinforcing studs are arranged to tilt vehicle-widthwisely outward, respectively, as the studs approach a roof panel.

In such a case, each of the reinforcing studs, which initially tilts in a direction reverse to the input direction of the side-surface impact, can receive the side-surface impact in a posture less deformable than that of the conventional upright arrangement to effectively transmit the impact through the rear-side cab mounting to the frame, which reduces allocation of the side-surface impact to the reinforcing stud on an input side of the side-surface impact to further suppress the tilt-down deformation in the direction reverse to the input direction of the side-surface impact.

Moreover, even if the tilt-down deformation occurs, the reinforcing stud still has a posture readily supportive of the vertical load succeeding the side-surface impact since the reinforcing stud verges from its initial posture tilting vehicle-widthwisely outward into a near upright position.

As a result, even when the vehicle and thus the cab further rolls into upside down (180-degree turn) to apply the vertical load on the cab, preliminarily avoided is a situation with great tilt-down deformation of the reinforcing studs by the preceding side-surface impact; even if the tilt-down deformation occurs, rather taken is the near upright posture readily supportive of the vertical load, so that the cab is strongly supported vertically by the reinforcing studs to suppress the crushing deformation.

Since the reinforcing studs have initial postures tilting vehicle-widthwisely outward, respectively, as the studs approach the roof panel, the vertical load applied on the cab generally acts to further tilt the reinforcing studs. However, the upper ends of the reinforcing studs are interconnected and constrained by the reinforcing beam so as not to increase a distance between the load support points, so that the reinforcing studs are prevented from being further tilted and an effect of strongly supporting the cab vertically by the reinforcing studs is satisfactorily maintained, resulting in suppressing the crushing deformation of the cab.

In this connection, the reinforcing beam mounted on the back panel to interconnect the upper ends of the reinforcing studs functions to suppress mutually reversed to-and-fro tilt-down deformations of the reinforcing studs. Also by this function, the effect of strongly supporting the cab vertically by the reinforcing studs is satisfactorily maintained.

Advantageous Effects of Invention

According to the car reinforcing structure of the invention as mentioned in the above, excellent effects and advantages can be obtained as mentioned below.

(I) Deformation can concentrate to the shock absorptive sections left at the vehicle-widthwise opposite ends of the reinforcing beam to absorb the energy of the preceding side-surface impact applied to the upper side surface of the cab in overturn, so that deformation of the section reinforced by the reinforcing beam and tilt-down deformation of the reinforcing studs in the direction reverse to the input direction of the side-surface impact can be suppressed. As a result, even if the vertical load is applied on the cab further having rolled into upside down (180-degree turn), the cab can be strongly supported vertically by the reinforcing studs having less tilt-down deformation by the preceding side-surface impact to suppress crushing deformation and thus can ensure a survival space enough for prompt escape of a driver.

(II) If employed is the construction where each of the load support points is set vehicle-widthwisely outward of the arrangement span of the rear-side cab mountings and the reinforcing studs are arranged to tilt vehicle-widthwisely outward, respectively, as the studs approach the roof panel, then the side-surface impact can be received in a posture less deformable than that of the conventional upright arrangement and can be effectively transmitted to the frame, which can reduce allocation of the side-surface impact to the reinforcing stud on the input side of the side-surface impact to further suppress the tilt-down deformation in the direction reverse to the input direction of the side-surface impact. Moreover, even if the tilt-down deformation occurs, the reinforcing stud on the input side of the side-surface impact can still have a posture readily supportive of the vertical load succeeding the side-surface impact since the reinforcing stud is deformed into a near upright position. Further, constraint by the reinforcing beam against the vertical load so as not to increase a distance between the load support points can prevent the reinforcing stud from being further tilted, and interconnection by the reinforcing beam can suppress mutually reversed to-and-fro tilt-down deformations of the reinforcing studs, so that the effect of strongly supporting the cab vertically by the reinforcing studs can be satisfactorily maintained. By synergic action of these effects, the deformation of the cab can be further effectively suppressed to ensure the survival space further widely.

DESCRIPTION OF EMBODIMENT

An embodiment of the invention will be described in conjunction with the drawings.

Figure 1:
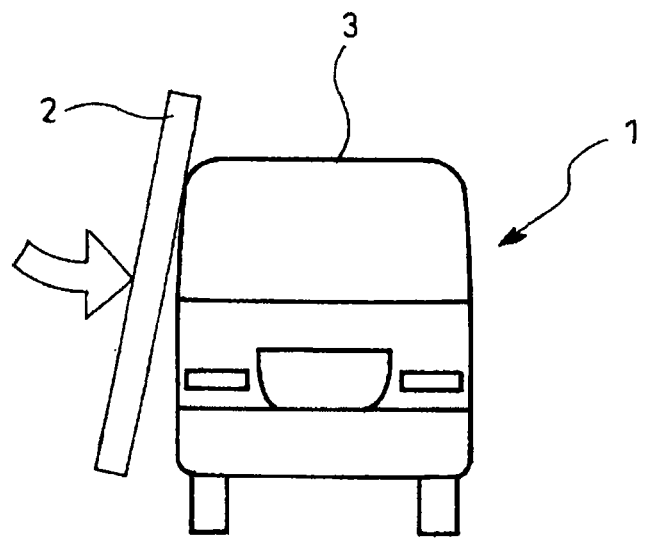
FIG. 1 is a pattern diagram showing a state of applying a side-surface impact on an upper side surface of a cab.
Figure 2:
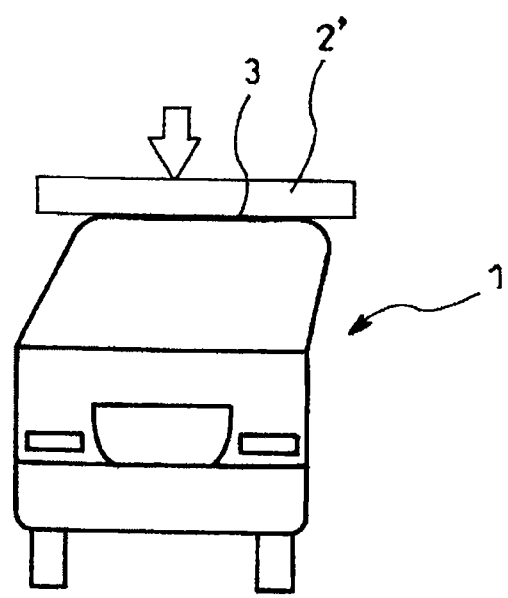
FIG. 2 is a pattern diagram showing a state of applying a vertical load on an upper surface of the cab.
Figure 3:
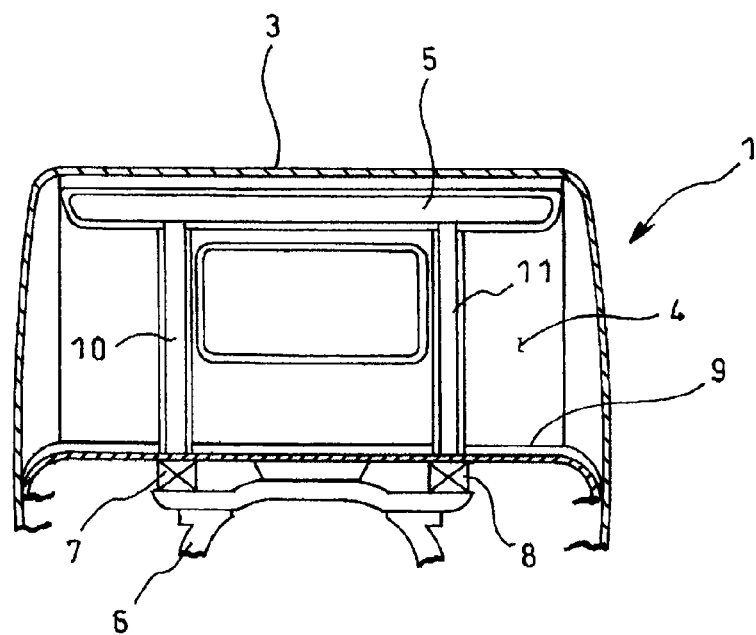
FIG. 3 is a schematic diagram showing a conventional example partly cut out for indoor viewing.
Figure 4:
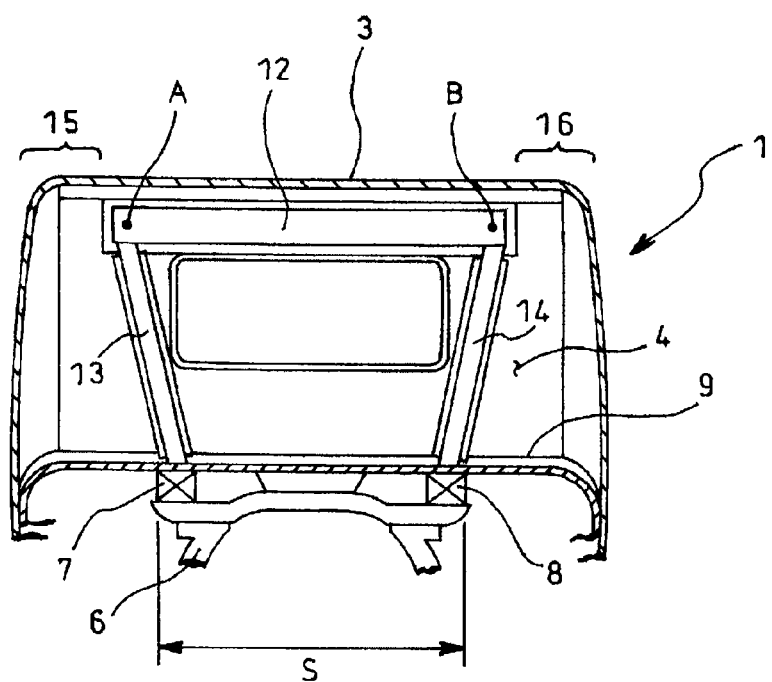
FIG. 4 is a schematic diagram showing an embodiment of the invention partly cut out for indoor viewing.

FIG. 4 exemplarily shows the embodiment of the invention in which parts same as those in FIG. 3 are represented by the same reference numerals.

In the embodiment shown in FIG. 4, like the above-mentioned conventional structure shown in FIG. 3, a reinforcing beam 12 and a pair of reinforcing studs 13 and 14 are mounted for reinforcement on an indoor wall surface of a back panel 4 in a cab 1. With two points each inward of a vehicle-widthwise outer end on an upper portion of the back panel 4 in the cab 1 by a predetermined length being set as load support points A and B, the paired reinforcing studs 13 and 14 are mounted on the back panel 4 to connect the load support points A and B with a floor 9 directly on a pair of rear-side cab mountings 7 and 8 for support of a rear of the cab 1 from a frame 6 while a reinforcing beam 12 is mounted on the back panel 4 to interconnect upper ends of the reinforcing studs 13 and 14, unreinforced sections being left as shock absorptive sections 15 and 16 at vehicle-widthwise opposite ends of the reinforcing beam 12. The load support points A and B are set vehicle-widthwisely outward of an arrangement span S of the rear-side cab mountings 7 and 8, respectively, so that the reinforcing studs 13 and 14 are arranged to tilt vehicle-widthwisely outward as the studs 13 and 14 approach a roof panel 3.

With the cab 1 reinforcing structure being constructed as mentioned above, even if the cab 1 rolls on its side to apply the side-surface impact on the upper side surface of the cab 1 in overturn, deformation concentrates to the shock absorptive portion 15 or 16 weak in strength relative to a section reinforced by the reinforcing beam 12 to absorb the energy of the side-surface impact, so that deformation of the section reinforced by the reinforcing beam 12 is suppressed and deformation of each of the reinforcing studs 13 and 14 tilted down in a direction reverse to the input direction of the side-surface impact is also suppressed.

In such a case, specifically each of the reinforcing studs 13 and 14 in the embodiment, which initially tilts in a direction reverse to the input direction of the side-surface impact, can receive the side-surface impact in a posture less deformable than that of the conventional upright arrangement to effectively transmit the impact through the rear-side cab mounting 7 or 8 to the frame 6, which reduces allocation of the side-surface impact to the reinforcing stud 13 or 14 on the input side of the side-surface impact to further suppress the tilt-down deformation in the direction reverse to the input direction of the side-surface impact.

Moreover, even if such tilt-down deformation occurs, the reinforcing stud 13 or 14 still has a posture readily supportive of the vertical load succeeding the side-surface impact since the reinforcing stud verges from its initial posture tilting vehicle-widthwisely outward into a near upright position.

As a result, even when the vehicle and thus the cab 1 further rolls into upside down (180-degree turn) to apply the vertical load on the cab 1, preliminarily avoided is a situation with great tilt-down deformation of the reinforcing studs by the preceding side-surface impact; even if such tilt-down deformation occurs, rather taken is the near upright posture readily supportive of the vertical load, so that the cab 1 is strongly supported vertically by the reinforcing studs 13 and 14 to suppress the crushing deformation.

Since the reinforcing studs 13 and 14 have initial postures tilting vehicle-widthwisely outward, respectively, as the studs approach the roof panel 3, the vertically applied load on the cab 1 generally acts to further tilt the reinforcing studs 13 and 14. However, the upper ends of the reinforcing studs 13 and 14 are interconnected and constrained by the reinforcing beam 12 so as not to increase a distance between the load support points A and B, so that the reinforcing studs 13 and 14 are prevented from being further tilted and the effect of strongly supporting the cab 1 vertically by the reinforcing studs 13 and 14 is satisfactorily maintained, resulting in suppressing the crushing deformation of the cab 1.

In this connection, the reinforcing beam 12 mounted on the back panel 4 to interconnect the upper ends of the reinforcing studs 13 and 14 functions to suppress mutually reversed to-and-fro tilt-down deformations of the reinforcing studs 13 and 14. Also by this function, the effect of strongly supporting the cab 1 vertically by the reinforcing studs 13 and 14 is satisfactorily maintained.

As mentioned in the above, according to the embodiment, in overturn, deformation can concentrate to the shock absorptive portion 15 or 16 left at vehicle-widthwise opposite ends of the reinforcing beam 12 to absorb the energy of the preceding side-surface impact applied on the upper side surface of the cab 1, so that deformation of the section reinforced by the reinforcing beam 12 and tilt-down deformation of the reinforcing studs 13 and 14 in a direction reverse to the input direction of the side-surface impact can be suppressed. As a result, even if the vertical load is applied on the cab 1 further having rolled into upside down (180-degree turn), the cab 1 can be strongly supported vertically by the reinforcing studs 13 and 14 having less tilt-down deformation by the preceding side-surface impact to suppress crushing deformation and thus can ensure a survival space enough for prompt escape of a driver.

Especially in the embodiment, each of the load support points A and B is set vehicle-widthwisely outward of the arrangement span S of the rear-side cab mountings 7 and 8 and the reinforcing studs 13 and 14 are arranged to tilt vehicle-widthwisely outward, respectively, as the studs approach the roof panel 3, so that the side-surface impact can be received in a posture less deformable than that of the conventional upright arrangement and can be effectively transmitted to the frame 6, which can reduce allocation of the side-surface impact to the reinforcing stud 13 or 14 on the input side of the side-surface impact to further suppress the tilt-down deformation in the direction reverse to the input direction of the side-surface impact. Moreover, even if the tilt-down deformation occurs, the reinforcing stud 13 or 14 on the input side of the side-surface impact can still have a posture readily supportive of the vertical load succeeding the side-surface impact since the reinforcing stud is deformed into a near upright position. Further, constraint by the reinforcing beam 12 against the vertical load so as not to increase a distance between the load support points A and B can prevent the reinforcing studs 13 and 14 from being further tilted, and interconnection by the reinforcing beam can suppress mutually reversed to-and-fro tilt-down deformations of the reinforcing studs 13 and 14, so that the effect of strongly supporting the cab 1 vertically by the reinforcing studs 13 and 14 can be satisfactorily maintained. By synergic action of these effects, the deformations of the cab 1 can be further effectively suppressed to ensure the survival space further widely.

It is to be understood that a cab reinforcing structure according to the invention is not limited to the above embodiment and that various changes and modifications may be made without departing from the scope of the invention. For example, in the illustrated embodiment, the reinforcing beam does not extend vehicle-widthwisely outward of the upper ends of the reinforcing studs so as to leave unreinforced sections at vehicle-widthwise opposite ends of the reinforcing beam; however, the reinforcing beam may extend vehicle-widthwisely outward of the upper ends of the reinforcing studs, such extensions being set to have beads or the like for absorption of the energy of the side-surface impact and being left as readily destroyable unreinforced sections.

REFERENCE SIGNS LIST 1 cab
3 roof panel
4 back panel
6 frame
7 rear-side cab mounting
8 rear-side cab mounting
9 floor
12 reinforcing beam
13 reinforcing stud
14 reinforcing stud
15 shock absorptive portion
16 shock absorptive portion
A load support point
B load support point
S arrangement span

The Invention claimed is:
1. A cab reinforcing structure, comprising:
a pair of reinforcing studs; and
a reinforcing beam,
wherein with two points each inward of a vehicle-widthwise outer end on an upper end portion of a back panel in a cab by a predetermined length is set as load support points,
wherein the pair of reinforcing studs are mounted on said back panel to connect said load support points with a floor directly on a pair of rear-side cab mountings for support of a rear of said cab from a frame while the reinforcing beam is mounted on said back panel to interconnect upper ends of said reinforcing studs, unreinforced sections being left as shock absorptive sections at vehicle-widthwise opposite ends of said reinforcing beam, and
wherein the load support points are set vehicle-widthwisely outward of an arrangement span of the rear-side cab mountings, respectively, so that the reinforcing studs are arranged to tilt vehicle-widthwisely outward, respectively, as the studs approach a roof panel.

* * * * *